May 9, 1944.  J. S. CLARK  2,348,607
VACUUM GAUGE
Filed June 23, 1942
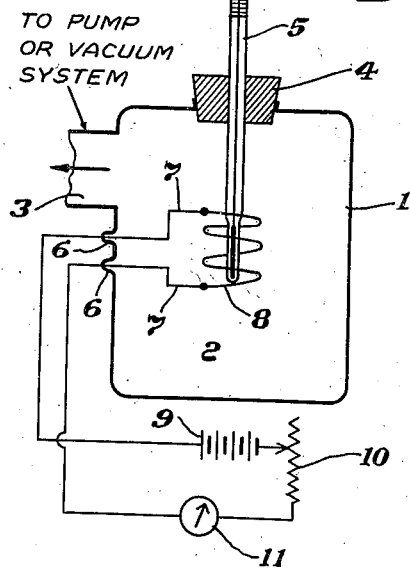
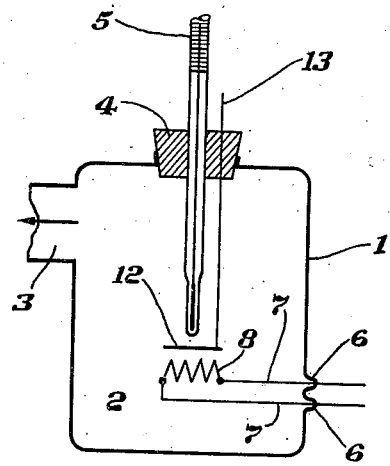
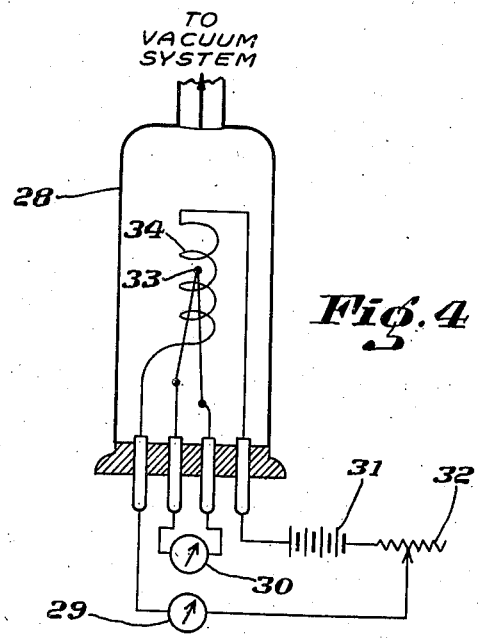
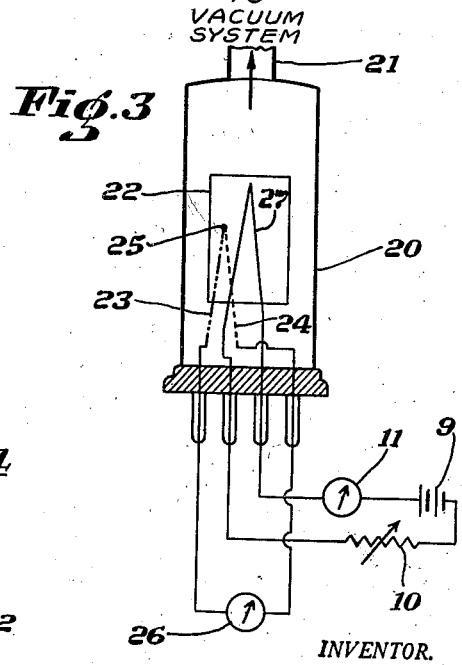
INVENTOR.
Joe S. Clark
BY
C. E. Hammett Jr.
ATTORNEY Patented May 9, 1944

2,348,607

UNITED STATES PATENT OFFICE 2,348,607

VACUUM GAUGE

Joe S. Clark, Cambridge, Mass., assignor to National Research Corporation, Boston, Mass., a corporation of Massachusetts Application June 23, 1942, Serial No. 448,181

5 Claims. (Cl. 73—31)

This invention relates to devices for measuring low pressures, and particularly to devices capable of reliable measurements of pressure over a wide range including pressures of the order of 1 to 200 mm. of mercury as well as lower pressures such as $10^{-4}$ mm. to 1 mm. of mercury.

In the measurement of the lower pressures, that is to say the higher vacua, such as pressures below 1 mm., there are at present used, in addition to oil or mercury manometers and the like, ionization gauges, thermocouple and Pirani gauges. The ionization gauge (O. E. Buckley, Nat. Acad. Sci., Proc. 2, 683, 1916) is well known in connection with the measurement of pressures below $10^{-3}$ mm. but cannot be used in the higher pressure range because of the high ionization currents and tendency of the filament to burn out. The thermocouple gauge consists of a heated element, such as a wire through which an electric current is passed, and a thermocouple attached directly thereto which measures the temperature of the wire. The temperature of the wire, for a given power input, varies with the pressure of the residual gas (since the cooling effect of the gas varies with pressure). This type of gauge has not been found practical for measurement of pressures above 2 mm. of mercury. Although oil or mercury manometers may be used at the higher as well as the lower pressures, their use is inconvenient because of problems of outgassing, obtaining sensitivity etc.

It is an object of this invention to provide a continuously operating and easily read vacuum gauge which will operate reliably over a wide range of pressures.

A further object is the provision of a vacuum gauge which will permit quick readings in the pressure range of 1 to 200 mm. of mercury, as well as at lower pressures.

According to this invention there is provided a heating element, preferably an electrically heated wire, and also, spaced therefrom and separated by the vacuum to be tested, a temperature measuring device. The transfer of heat across the vacuum from the heated element to the measuring element depends upon the pressure of the residual gas so that the temperature indicated by the measuring element bears a distinct and stable relation to the pressure of the residual gas.

In a modified form of the invention a shield is introduced between the heating and measuring elements to prevent direct heat transfer by radiation from the heating element to the measuring element.

The invention is illustrated in the accompanying drawing, in which:

Fig. 1 is a diagrammatic elevational view of one form of pressure gauge according to the invention;

Fig. 2 is a similar view of a modified form of pressure gauge, and

Figs. 3 and 4 are diagrams of other modified forms of pressure gauges.

In Fig. 1 there is shown a vessel 1 in which a vacuum is maintained. The enclosed space 2 is connected at 3 to a vacuum system, not shown, the pressure in which it is desired to measure. Through a tight closure, such as a suitable stopper 4, a thermometer 5 is introduced into the vessel 1. Through suitable seals 6, wires 7 are brought into the vessel. The wires 7 connect with a resistance coil 8 which is supported in a spaced relation to the thermometer 5. A battery 9 furnishes electric current to the heating coil 8, through an adjustable resistance 10 by which the energy input to the heating coil may be regulated. An ammeter 11 serves to measure the current in the circuit (from which the energy input to the heating coil may readily be determined).

Fig. 2 shows a modified form of the invention. For convenience the top of the thermometer and the electric power supply are omitted from this figure. In addition to the heating coil 8 and the thermometer 5 there is provided in this form of apparatus a shield 12 carried on a support 13. The shield 12 is preferably a thin sheet or plate of metal large enough to intercept all direct radiation between the heating coil 8 and the thermometer 5.

Fig. 3 shows another modified form of the invention in which the structure of a conventional vacuum tube is utilized. Either glass or metal types of vacuum tubes may be employed. The shell or envelope 20 of the vacuum tube is connected by a conduit 21 with the vacuum system in which it is desired to measure the pressure. The plate electrode 22 is used to perform the function of the thermometer 5 and for that purpose the sensitive junction of a thermocouple 23, 24 is attached to the plate electrode, as by welding, at a suitable point 25. The thermocouple leads are brought out of the tube through the usual base pins and are connected with a suitable indicating instrument 26, such as a millivoltmeter. Inside the tube and spaced from the plate electrode is a cathode or filament 27 which is adapted to be heated by an electric current. In the device of Fig. 3 the filament is heated in a normal way by a current passing through the usual base pins, but means are provided to regulate and observe the current as in the arrangement of Fig. 1.

It will thus be seen that the device of this invention comprises an element maintained at a relatively high temperature, such as 100–700° C., and a temperature measuring element, separated from each other by the vacuum to be measured. It does not depend directly on the cooling effect of the residual gas on a heating element, but rather on the ability of the gas to transmit heat from one point to another point.

Another modification of this device in this particular system, illustrated in Fig. 4, is a coil of nichrome, or other type of wire 34 which is mechanically supported inside a metal envelope such as is employed with a standard metal radio type tube. The inner volume of this tube is vacuum tight and connected to the vacuum system, which is not shown. Located substantially on the axis and middle of coil 34 is the thermocouple 33, with its junction at the point as illustrated.

When a known amount of current, measured by the ammeter 29, as supplied by the battery 31 and adjusted by a rheostat 32, is passed through the coil, a reading will be obtained on the meter 30, depending upon the voltage developed by the thermocouple 33. The extent to which heat is transferred from the coil to the thermocouple junction will depend upon pressure within the envelope—that is, within the vacuum system. In this manner, direct readings of pressure may be obtained on the millivoltmeter 30.

The relationship between temperature and pressure in a device of this sort is substantially that given in the table below, for the system as set up in Fig. 1. The thermocouple readings, of course, can be interpreted in terms of pressure. A device of this sort permits one remotely to control or record pressure at a distant point and, from a mechanical point of view, this system as shown in Fig. 4 is preferable to that of Fig. 1.

This type of apparatus permits reliable measurements over a wide range of pressures. For instance, with an apparatus of the type of Fig. 1, the following thermometer readings were obtained for the pressures indicated below, all measurements being made with the same energy input to the heating element:

| Pressure (mm. Hg.) | Temperature, °C. |
| --- | --- |
| 11 | 248 |
| 4 | 245 |
| 1 | 236 |
| .4 | 225 |
| .2 | 213 |
| .1 | 203 |
| .05 | 197 |
| .02 | 192 |
| .01 | 191 |
| .001 | 190.5 |

When the pressure is raised to atmospheric pressure (760 mm.) the recorded temperature begins to fall extensively with pressure after a certain point below atmospheric pressure is reached. This does not prevent the use of the device at the higher pressures so long as precautions are taken to determine on what branch of the calibration curve the device is operating. Since the thermometer mounting is part of the heat flow circuit, there will be some heat loss by conduction through the thermal connection of the thermometer element and the vessel which will affect the calibration of the instrument, and precautions should be taken to keep this factor constant.

Other thermosensitive devices can, of course, be used in place of a mercury thermometer or a thermocouple in the apparatus of this invention. Instead of an indicating instrument such as the usual thermometer, a recording instrument could be employed. The apparatus of this invention is adapted to the making of a continuously recorded measurement of pressure.

By the means herein described quick, accurate readings of pressure over a wide pressure range from $10^{-4}$ mm. and below to 200 mm., or even to atmospheric pressure, may be obtained. Moreover, I have found that these means are exceptionally sensitive in the difficult range of 5 mm. down to $10^{-4}$ mm.

I claim:

1. Apparatus for measuring the pressure of the gaseous medium in a partial vacuum, said apparatus having a heater and a temperature measuring device mounted in spaced relation to each other within the medium with said medium the sole heat conductor in mutual contact with said heater and said device so that the amount of heat transference from the heater to the device affords a measure of the amount of pressure.

2. Apparatus for measuring the pressure of the gaseous medium in a partial vacuum, said apparatus having an electric heater, a temperature measuring device mounted in spaced relation thereto and a shield located between the heater and the temperature measuring device to obstruct direct radiation from the heater to said measuring device, the said heater, shield and measuring device being located within the medium with said medium the sole heat conductor in mutual contact with said heater and said device so that the amount of heat transference from the heater to the device affords a measure of the amount of pressure.

3. Apparatus for measuring the pressure of the gaseous medium in a partial vacuum, said apparatus having an electric heater and a thermometer mounted in spaced relation to each other within the medium with said medium the sole heat conductor in mutual contact with said heater and said thermometer so that the amount of heat transference from the heater to the thermometer affords a measure of the amount of pressure.

4. Apparatus for measuring the pressure of the gaseous medium in a partial vacuum, said apparatus having a heater and a temperature measuring device mounted in spaced relation to each other within the medium with said medium the sole heat conductor in mutual contact with said heater and said device so that the heat generated by the heater passes through the medium to the measuring device, and means for measuring the energy input to the heater so that the amount of heat transference through the medium and thereby the pressure of the medium may be determined.

5. Apparatus for measuring the pressure of the gaseous medium in a partial vacuum, said apparatus having an electric heater and a thermocouple mounted in spaced relation to each other within the medium with said medium the sole heat conductor in mutual contact with said heater and said thermocouple so that heat generated by the heater passes through the medium to the thermocouple, means for measuring the energy input to the heater and means for measuring the voltage drop through the thermocouple so that the amount of heat transference through the medium and thereby the pressure of the medium may be determined.

JOE S. CLARK.